United States Patent [19]
Chai et al.

[11] 3,896,105
[45] July 22, 1975

[54] (N-PROPIONYL)-GLY-CYS-LYS-ASN-PHE-PHE-TRP-LYS-THR-PHE-THR-SER-CYS-OH AND INTERMEDIATES

[75] Inventors: Sie-Yearl Chai, Royersford; John P. Yardley, King of Prussia, both of Pa.

[73] Assignee: American Home Products Corporation, New York, N.Y.

[22] Filed: Apr. 1, 1974

[21] Appl. No.: 457,158

[52] U.S. Cl. ............................. 260/112.5; 424/177
[51] Int. Cl. ..................... C07c 103/52; A61k 37/00
[58] Field of Search ................................. 260/112.5

[56]  References Cited
   UNITED STATES PATENTS
| | | | |
|---|---|---|---|
| 3,446,789 | 5/1969 | Rudinger et al. | 260/112.5 |
| 3,454,549 | 7/1969 | Boissonnas et al. | 260/112.5 |
| 3,497,491 | 2/1970 | Zaoral et al. | 260/112.5 |

OTHER PUBLICATIONS

Berde, et al.: "Neurohypophysical Hormones and Similar Polypeptides, Handbook of Experimental Pharmacology," Vol. 23, Eichler, et al., eds., Springer-Verlag, Berlin, 1968, pp. 842–847, 856–857, 862.
Vale et al.: C. R. Acad. Sci., Paris, Ser. D, 275, 2913–2916, (1972).
Brazeau, et al.: Science, 179, 77–79, (1973).
Burgus, et al.: Proc. Nat. Acad. Sci., USA, 70, 684–688, (1973).
Rivier, et al.: C. R. Acad. Sci., Paris, Ser. D, 276, 2737–2740, (1973).
Sarantakis, et al.: Biochem. Biophys. Res. Comm., 54, 234–238, (1973).

*Primary Examiner*—Lewis Gotts
*Assistant Examiner*—Reginald J. Suyat

[57]  ABSTRACT

The tridecapeptide (N-propionyl)-Gly-Cys-Lys-Asn-Phe-Phe-Trp-Lys-Thr-Phe-Thr-Ser-Cys-OH, its oxidized form as well as novel intermediates used in the synthesis of such tridecapeptides are described. These tridecapeptides inhibit the secretion of the hormone somatotropin (growth hormone).

6 Claims, No Drawings

(N-PROPIONYL)-GLY-CYS-LYS-ASN-PHE-PHE-TRP-LYS-THR-PHE-THR-SER-CYS-OH AND INTERMEDIATES

This invention relates to novel tridecapeptides and intermediates obtained in their synthesis by the solid phase method of peptide synthesis.

Somatostatin (also known as somatotropin release inhibiting factor or SRIF) is the tetradecapeptide

```
  ┌─────────────────────────────────┐
H-Ala-Gly-Cys-Lys-Asn-Phe-
Phe-Trp-Lys-Thr-Phe-Thr-Ser-Cys-OH.
```

This tetracecapeptide has only recently been identified by isolation from extracts of ovine hypothalamic tissues and found to inhibit the secretion of the hormone (GH); See Brazeau, et al., Science, 179 pp 77-79 (January 1973). The linear form of this tetradecapeptide, H—Ala—Gly—Cys— Lys—Asn—Phe—Phe—Trp—Lys—Thr—Phe—Thr—Ser—Cys—OH, has also been reported by Brazeau, et al., supra, to have been synthesized by solid phase methodology and found to have the same biological activity as the somatostatin obtained from a natural source.

The novel tridecapeptides of the present invention are analogs of somatostatin and the linear counterpart of somatostatin in which the amino acid residue of alanine

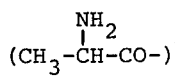

in the one position has been replaced by the propionyl group ($CH_3CH_2CO-$).

The tridecapeptides of the present invention which inhibit the secretion of the hormone somatotropin are represented by the formula

```
     ┌─────────────────────────────────────────────────┐
(N-propionyl)-Gly-Cys-Lys-Asn-Phe-Phe-Trp-Lys-Thr-Phe-Thr-Ser-Cys-OH,
```

(I-cyclic or oxidized form)

(N-propionyl)-Gly-Cys-Lys-Asn-Phe-Phe-Trp-Lys-Thr-Phe-Thr-Ser-Cys-OH (II-linear form)

and the non-toxic acid addition salts thereof. Illustrative of acid addition salts are hydrochloride, hydrobromide, sulfate, phosphate, maleate, acetate, citrate, benzoate, succinate, malate, ascorbate and the like.

The nomenclature used to depict the peptides follow that shown is by Schroder and Lubke, "The Peptides," 1 pp viii-xxix (Academic Press 1965). All chiral amino acid residues identified in formulas I and II, supra, and the other formulas hereinafter are of the natural or L-configuration unless specified otherwise.

The present invention also relates to novel tridecapeptide intermediates of the formula (N-propionyl)—Gly–Cys($R^1$)—Lys($R^2$)—Asn—
Phe—Phe—Trp—Lys($R^2$)—Thr($R^3$)—
Phe—Thr($R^3$)—Ser($R^4$)—Cys($R^1$)—X (III)

wherein:

$R^1$ is a protecting group for the sulfhydryl group on the cysteinyl amino acid residue in the tridecapeptide or $R^1$ is hydrogen. Illustrative of $R^1$ is a group selected from the class consisting of benzyl; substituted benzyl wherein the substituent is at least one of methyl, methoxy, nitro(e.g. p-methylbenzyl, p-methoxybenzyl, p-nitrobenzyl, 2,4,6-trimethylbenzyl, etc.,); trityl, benzyloxycarbonyl, benzhydryl, p-methoxybenzyloxycarbonyl, benzylthiomethyl, ethylcarbonyl, thioethyl, tetrahydropyranyl, acetamidomethyl, benzoyl, sulfate salt, etc.

$R^2$ is a protecting group for the side chain amino substituent of lysine or $R^2$ is hydrogen which means there is no protecting group on the side chain amino substituent. Illustrative of suitable side chain amino protecting groups are benzyl, chlorobenzyloxycarbonyl, benzyloxycarbonyl, tosyl, 2,4-dinitrophenyl, t-amyloxycarbonyl, t-butyloxycarbonyl, etc. The selection of such a side chain amino protecting group is not critical except that it must be one which is not removed during cleavage of the α-amino protecting group during the synthesis until the peptide of the desired amino acid sequence is obtained. Hence, the α-amino protecting and side chain amino protecting group cannot be the same;

$R^3$ and $R^4$ are protecting groups for the alcoholic hydroxyl group of threonine and serine and is selected from the class consisting of acetyl, tosyl, benzoyl, tert-butyl, trityl, benzyl, benzyloxycarbonyl, 2,6-dichlorobenzyl, 4-bromobenzyloxycarbonyl and tetrahydropyranyl. The preferred protecting group is benzyl; or $R^3$ and $R^4$ is hydrogen which means there is no protecting group on the alcoholic hydroxyl function; the selection of these protecting groups is not critical except that it must be one which is not removed during cleavage of the α-amino protecting group during the synthesis until the peptide of the desired amino acid sequence is obtained X is selected from the group consisting of OH, $OCH_3$ and an anchoring bond used in solid phase synthesis linked to a solid resin support represented by the formula

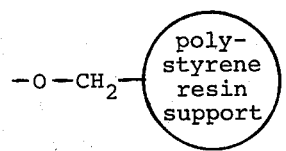

The polystyrene resin support is preferably a copolymer of styrene with about 1 to 2% divinyl benzene as a cross linking agent which causes the polystyrene polymer to be completely insoluble in certain organic solvents. The polystyrene polymer is composed of long alkyl chains bearing a phenyl ring on every second carbon and the terminal amino acid residue (Cys) is joined through a covalent carbon to oxygen bond to these phenyl rings. The alkyl chains are cross linked at approximately every fiftieth carbon by p-diethylphenyl residues derived from divinyl benzene.

In formula III, if X is OH, at least one of $R^1$, $R^2$, $R^3$ and $R^4$ is a protecting group.

In selecting a particular side chain protecting group to be used in the synthesis of the peptides of formulas I, II and III the following rules should be followed: (a) the protecting groups must be stable to the reagent and under the reaction conditions selected for removing the α-amino protecting group at each step of the synthesis, (b) the protecting group must retain its protecting properties (i.e., not be split off under coupling conditions, and (c) the side chain protecting group must be removable upon the completion of the synthesis containing the desired amino acid sequence under reaction conditions that will not alter the peptide chain.

The tridecapeptide peptide of formulas I, II and III are prepared using solid phase synthesis. The synthesis is commenced from the C-terminal end of the peptide using α-amino protected resin. Such a starting material can be prepared by attaching an α-amino protected cysteine to a chloromethylated resin or a hydroxymethyl resin. The preparation of the hydroxymethyl resin is described by Bodanszky, et al., Chem. Ind (London) 38, 1597–98 (1966). A chloromethylated resin is commercially available from Bio Rad Laboratories Richmond, Calif. and the preparation of such a resin is described by Stewart, et al., "Solid Phase Peptide Synthesis" (Freeman and Co. San Francisco 1964), Chapter 1, pp 1–6. The α-amino protected cysteine is coupled to the chloromethylated or hydroxymethyl resin with the aid of a carboxyl group activating compound such as described in Kapoor, J. Pharm. Sci. 59, pp 1–27 (1970) the disclosure of which is incorporated herein by reference. Following the coupling of the α-amino protected cysteine to the resin support, the α-amino protecting group is removed such as by using trifluoroacetic acid in methylene chloride, trifluoroacetic acid alone or HCl in dioxane. The deprotection is carried out at a temperature between about 0°C and room temperature. Other standard cleaving reagents and conditions for removal of specific α-amino protecting groups may be used as described in Schroder and Lubke, supra,1 pp 72–75. After removal of the α-amino protecting group the remaining α-amino acids are coupled step-wise in the desired order to obtain a compound of formula III. However, as an alternate to adding each amino acid separately to the reaction, some of them may be coupled prior to addition to the solid phase reactor. Each protected amino acid or amino acid sequence, is introduced into the solid phase reactor in about a four-fold excess and the coupling is carried out in a medium of dimethylformamide: methylene chloride (1:1) or in dimethylformamide or methylene alone. In cases where incomplete coupling occurred the coupling procedure is repeated before removal of the α-amino protecting group, prior to the coupling of the next amino acid to the solid phase reactor. The success of the coupling reaction at each stage of the synthesis is monitored by the ninhydrin reaction as described by E. Kaiser, et al., Analyt. Biochem, 34, 595 (1970).

After the desired amino acid sequence of formula III has been synthesized to obtain R—Gly—Cys($R^1$)—Lys($R^2$)—Asn—Phe—Phe—Trp— Lys($R^2$)—Thr($R^3$)—Phe—The($R^3$)—Ser($R^4$)—Cys($R^1$)—X wherein R is an α-amino protecting group, the α-amino group R is removed in the manner previously described after which the tridecapeptide-resin is reacted with propionic anhydride or other carboxylic acid activated form of propionic acid (e.g. propionyl chloride). The α-amino protecting groups contemplated by R are those known to be useful in the art in the step-wise synthesis of polypeptides such as t-butyloxycarbonyl, d-isobornyloxycarbonyl, trityl, benzyloxycarbonyl, tosyl, nitrophenylsulfonyl, adamantyloxycarbonyl and others such as described in copending application Ser. No. 457,038 filed Apr. 1, 1974, in the name Yardley and Chai.

The peptide is then removed from the resin support by treatment with a reagent such as hydrogen fluoride which not only cleaves the peptide from the resin but also cleaves all remaining side chain protecting groups $R^1$, $R^2$, $R^3$, $R^4$ to obtain directly a compound of formula II. As an alternate route, the tridecapeptide linked to the resin support may be separated from the resin by methanolysis after which the recovered C-terminal methyl ester is converted to the acid by hydrolysis. Any side chain protecting group may then be cleaved by the procedure previously described or by other procedures such as catalytic reduction (e.g., Pd on $BaSO_4$) using conditions which will keep the Trp moiety intact. When using hydrogen fluoride for cleaving, anisole is included in the reaction vessel to prevent the oxidation of labile amino acid (e.g. tryptophan). The compounds of formula II are converted to compounds of formula I by air oxidation as described in Example 5.

The solid phase synthesis procedure discussed supra, is well known in the art and has been essentially described by M. Monahan, et al., C. R. Acad. Sci, Paris, 273, 508 (1971).

The following examples are illustrative of the preparation of the compounds of formulas I, II and III.

EXAMPLE 1

The preparation of t-Butyloxycarbonyl-S-p-methoxybenzyl-L-cysteine Resin

A mixture of chloromethylated resin (Bio-Beads S-XL, 200–400 mesh, (1.1 meq/g.)) (25.0 g. or 27.5 mmole), t-butyloxycarbonyl-S-p-methoxybenzyl-L-cysteine (9.4 g. or 27.5 mmole), triethylamine (3.4 ml. or 24.0 mmole) and absolute ethyl alcohol (125 ml.) is refluxed for 48 hours. After being cooled, the reaction mixture is filtered, washed with ethanol and dried under vacuo.

The resin (28.5 g.) is substituted to the extent of 0.4 mmoles of t-butyloxycarbonyl-S-p-methoxybenzyl-L-cysteine per gram of resin.

EXAMPLE 2 t-butyloxycarbonyl-S-p-methoxybenzyl-L-cysteinyl-ε-benzyloxycarbonyl-L-lysyl-L-asparaginyl-L-phenylalanyl-L-phenylalanyl-L-tryptophyl-ε-benzyloxycarbonyl-L-lysyl-O-benzyl-L-threonyl-L-phenylalanyl-O-benzyl-L-threonyl-O-benzyl-L-serine-S-p-methoxybenzyl-L-cysteine resin The t-butyloxycarbonyl-S-p-methoxybenzyl-L-cysteine resin (28.5 g.) of Example 1 is placed in a Merrifield vessel of 300 ml. capacity, is washed with methanol (200 ml.) twice and methylene chloride (200 ml.) twice, allowing a contact time of at least 3 minutes each. The peptide-resin is then subjected to a ninhydrin test following the procedure of E. Kaiser, et al., Analytical Biochemistry 34, 595 (1970). It should be negative at this stage.

The deprotection of the α-amino protecting group from t-butyloxycarbonyl-S-p-methoxybenzyl-L-cysteine is carried out as follows: The peptide-resin is treated with a 1:1 solution of trifluoroacetic acid-methylene chloride which contains 5% 1,2-ethane dithiol (three times for 15 minutes each), and put through the following wash cycle:

(a) methylene chloride; (b) dimethylformamide; (c) triethylamine (12.5%) in dimethylformamide (three times for 10 minutes each); (d) methanol (two times); (e) methylene chloride (two times). Again, a sample of the peptide resin is subjected to a ninhydrin test. The sample is now strongly positive indicating removal of the α-amino protecting group from the cysteine molecule attached to the resin.

The resin so prepared is then gently shaken with t-butyloxycarbonyl-o-benzyloxy-L-serine (8.4 g., 28.5 mmoles) in dimethylformamide. 28.5 ml. of 1M dicyclohexylcarbodiimide in dimethylformamide is added in two portions over a period of 30 minutes. Shaking is continued at ambient temperature for a total of 18 hours. The peptide resin is then washed successively with methanol (twice) and methylene chloride (twice). To test for completeness of reaction, the peptide resin is subjected to a ninhydrin reagent. It should be negative at this stage.

The removal of the α-amino protecting group at each step is performed as described for the deprotection of the t-butyloxycarbonyl-S-p-methoxybenzyl-L-cysteine resin.

The following amino acid residues are then introduced consecutively (BOC means butyloxycarbonyl): t-BOC-O-benzyl-L-threonine (28.5 mmoles, 28.5 mmoles DCC), t-BOC-L-phenylalanine (28.5 mmoles, 28.5 mmoles DCC), t-BOC-O-benzyl-L-threonine (28.5 mmoles, 28.5 mmoles DCC), t-BOC-ebenzyloxycarbonyl-L-lysine (28.5 mmoles, 28.5 moles DCC), t-BOC-L-tryptophan (28.5 mmoles, 28.5 mmoles DCC), t-BOC-L-phenylalanine (28.5 mmoles, 28.5 mmoles DCC), t-BOC-L-phenylalanine (28.5 mmoles, 28.5 mmoles DCC), t-BOC-L-asparagine-p-nitrophenylester, t-BOC-ε-benzyloxycarbonyl-L-lysine (28.5 mmoles, 28.5 mmoles DCC) and t-BOC-S-p-methoxybenzyl-L-cysteine (28.5 mmoles, 28.5 mmoles DCC). Each coupling step is carried out in a medium of dimethylformamide with the exception of asparagine which is used as 1% acetic acid in dimethylformamide. At this stage, the resin is washed, dried under vacuo and weighs 42.0 g.

EXAMPLE 3

(N-propionyl)-glycyl-S-p-methoxybenzyl-L-cysteinyl-benzyloxycarbonyl-L-lysyl-L-asparaginyl-L-phenylalanyl-L-phenylalanyl-L-tryptophyl-L-benzyloxycarbonyl-L-lysyl-O-benzyl-ε-threonyl-L-phenylalanyl-O-benzyl-L-threonyl-O-benzyl-L-seryl-S-p-methoxybenzyl-L-cysteine resin The dodecapeptide resin (4.0 g.) obtained in Example 2 is treated with a 1:1 solution of trifluoroacetic acid-methylene chloride which containd 5% 1,2-ethane dithiol (three times for 15 minutes each), and put through the following wash cycle:

(a) methylene chloride; (b) dimethylformamide; (c) triethylamine (12.5%) in dimethylformamide (three times for 10 minutes each); (d) methanol (two times); (e) methylene chloride (two times). Again, a sample of the peptide resin is subjected to a ninhydrin test. The sample is now strongly positive indicating removal of the ε-amino protecting group from the molecule attached to the resin. The product resulting from this deprotection is S-p-methoxybenzyl-L-cysteinyl-benzyloxycarbonyl-L-lysyl-L-asparaginyl-L-phenylalanyl-L-phenylalanyl-L-tryptophyl-benzyloxycarbonyl-L-lysyl-O-benzyl-L-threonyl-L-phenylalanyl-O-benzyl-L-threonyl-O-benzyl-L-serine-S-p-methoxybenzyl-L-cysteine-resin.

The foregoing ε-amino deprotected peptide resin (4 g) is then coupled with t-BOC-glycine (5.7 mmoles, 5.7 ml. DCC) in dimethylformamide for 18 hours. The reaction mixture is washed with methanol (twice) and methylene chloride (twice). The peptide-resin is then subjected to a ninhydrin reagent to test for completeness of reaction. The resulting tridecapeptide, t-BOC-glycyl-S-p-methoxybenzyl-L-cysteinyl-benzyloxycarbonyl-L-lysyl-L-asparaginyl-L-phenylalanyl-L-phenylalanyl-L-tryptophyl-benzyloxycarbonyl-L-lysyl-O-benzyl-L-threonyl-L-phenylalanyl-O-benzyl-L-threonyl-O-benzyl-L-seryl-S-p-methoxybenzyl-L-cysteine resin is treated with a 1:1 solution of trifluoroacetic acid-methylene chloride which contains 5% 1,2-ethane dithiol (three times for 15 minutes each) which removes the t-BOC group and put through the following wash cycle:

(a) methylene chloride; (b) dimethylformamide; (c) triethylamine (12.5%) in dimethylformamide (three times for 10 minutes each); (d) methanol (two times); (e) methylene chloride (two times). The sample is now strongly positive indicating removal of the ε-amino protecting group from the molecule attached to the resin.

The washed tridecapeptide-resin is shaken with propionic anhydride (5.0 ml.) in methylene chloride (30 ml.) for 3 hours. After washing with methanol (twice) and methylene chloride (twice), the peptide resin is tested by ninhydrin reagent. It should be negative at this stage. The peptide resin is dried in vacuo, and yields 4.0 g of the above-titled compound.

EXAMPLE 4

(N-propionyl)-glycyl-L-cysteinyl-L-lysyl-L-asparaginyl-L-phenylalanyl-L-phenylalanyl-L-tryptophyl-L-lysyl-L-threonyl-L-phenylalanyl-L-threonyl-L-seryl-L-cysteine The above described peptide-resin (3.6 g.) from Example 3 is treated in vacuo with liquid hydrogen fluoride (36 ml.) and anisole (10.8 ml.) at ice bath temperature for 1 hour and at room temperature for 10 minutes. The hydrogen fluoride and the anisole are removed as quickly as possible and the remaining solids extracted with ether and 700 ml. of degassed 1N acetic acid which is used for further reaction without being lyophilized.

EXAMPLE 5

(N-propionyl-glycyl-L-cysteinyl-L-lysyl-L-asparaginyl-L-phenylalanyl-L-phenylalanyl-L-tryptophyl-L-lysyl-L-threonyl-L-phenylalanyl-L-threonyl-L-seryl-L-cysteine
(cyclic 2,13 disulfide)

The 1N acetic acid extract from Example 4 is cooled at 5°C and the pH adjusted at 7.4 with 250 ml. of 1N ammonium hydroxide. The mixture is bubbled through nitrogen for 10 minutes, and allowed to stand at room temperature for 63 hours. After lyophilization, 950 mg. of a white powder is obtained.

EXAMPLE 6

Purification and characterization of
(N-propionyl)-glycyl-L-cystinyl-L-lysyl-L-asparaginyl-L-phenylalanyl-L-phenylalanyl-L-tryptophyl-L-lysyl-L-threonyl-L-phenylalanyl-L-threonyl-L-seryl-L-cystine The crude peptide (250 mg.) of Example 5 is dissolved in a minimum volumn of 2N acetic acid which contains 0.5% mercaptoethanol and which also is degassed, applied to a Sephadex G-25 gel filtration column (175 cm × 2.5 cm) and eluted with the same solvent. Fractions of 10 ml. each are collected. The fractions containing the desired peptide are located by ninhydrin spot test and UV analysis (280 μ).

After lyophilization, a white fluffy powder (52 mg.) of the above-tilted product is obtained.

A partition column of Sephadex G-25 fine (75 cm × 2.5 cm) is prepared by equilibration with lower phase and then upper phase of the BAW solvent system (N-butanol:acetic acid:water, 4:1:5).

The lyophilized peptide from above is applied in a minimum volume of upper phase. Elution with upper phase (7 ml. fractions) affords the desired product which is located by ninhydrin spot test and UV analysis (280 μ). After pooling and lyophilization, there is obtained a white powder (23 mg.) which contains a trace impure material.

The above peptide is rechromatographed by BAW partition column (58 cm. × 1 cm) as described above, and a white fluffy powder (10 mg.) is obtained. $[\alpha]_D^{25}$ = −17.95 (c=1.022, 1% acetic acid).

Amino acid analysis gives the following ratios: Asn (1.0); Thr (2.2); Ser (0.6); Gly (1.1); Phe (2.9); $NH_3$ (2.4); $R_f$ (on silica); 0.33 (B:A:W:, 4:1:5), 0.47 (n-butanol:ethyl acetate:acetic acid:water, 1:1:1:1).

The growth hormone release inhibiting activity of the compound of Example 6 was determined by radioimmunoassay in a rat pituitary cell culture system as described by Vale, et al, Endocrinology 91, pp 562 (1972) and Grant, et al., Biochemical and Biophysical Research Communications 51, pp 100–106 (1973). The compound of Example 6 was found active in inhibiting growth hormone release at a concentration as low as 5 ng/ml.

The compound of formulas I and II, described herein may be administered to warm blooded mammals, including humans, either intravenously, subcutaneously, intramuscularly or orally to inhibit the release of growth hormone where the host being treated requires therapeutic treatment for excess secretion of somatotropin which is associated with conditions such as juvenile diabetes and acromegaly. The contemplated does range for oral administration in tablet or capsule form to large mammals is about 0.015 mg to about 7 mg/kg of body weight per day while the dose range for intravenous injection in an aqueous solution is about 0.1 g to about 0.15 mg/kg of body weight per day. When administered subcutaneously or intramuscularly a dose range of about 1.5 g to about 7 mg/kg of body weight per day is contemplated. Obviously, the required dosage will vary with the particular condition being treated, the severity of the condition and the duration of treatment.

If the active ingredient is administered in tablet form the tablet may contain: a binder such as gum tragacanth, corn starch, gelatin, an excipient such as dicalcium phosphate; a disintegrating agent such as corn starch, alginic acid, etc.; a lubricant such as magnesium stearate; and a sweetening and/or flavoring agent such as sucrose, lactose, wintergreen, etc. Suitable liquid carriers for intravenous administration include isotonic saline, phosphate buffer solutions, etc.

What is claimed is:

1. A tridecapeptide selected from those of the formula

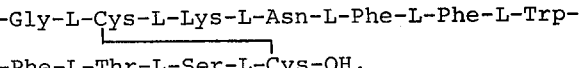
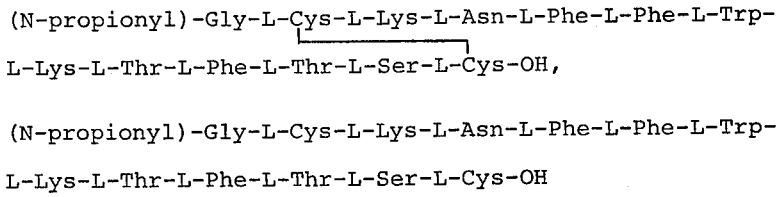
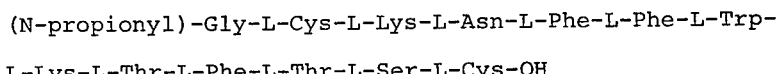

and the non-toxic acid addition salts thereof.

2. A peptide according to claim 1 which is: N-propionyl-glycyl-L-cysteinyl-L-lysyl-L-asparaginyl-L-phenylalanyl-L-phenylalanyl-L-tryptophyl-L-lysyl-L-threonyl-L-phenylalanyl-L-threonyl-L-seryl-L-cysteine and a non-toxic acid accition salt thereof.

3. A peptide according to claim 1 which is: N-propionyl-glycyl-L-cysteinyl-L-lysyl-L-asparaginyl-L-phenylalanyl-L-phenylalanyl-L-tryptophyl-L-lysyl-L-threonyl-L-phenylalanyl-L-threonyl-L-seryl-L-cysteine (cyclic 2,13 disulfide) and a non-toxic acid addition salt thereof.

4. A compound of the formula (N-propionyl)—Gly—L—Cys($R^1$)—L—Lys($R^2$)—L—Asn—L—Phe—L—Phe—L—Trp—L—Lys($R^2$)—L—Thr($R^3$)—L—Phe—L—Thr($R^3$)—L—Ser($R^4$)—L—Cys($R^1$)—X wherein:

$R^1$ is selected from the group consisting of hydrogen and a protecting group for the sulfhydryl group on the cysteinyl amino acid residue;

$R^2$ is selected from the group consisting of hydrogen and a protecting group for the side chain amino substituent of the lysine residue;

$R^3$ and $R^4$ are selected from the group consisting of hydrogen and a protecting group for the alcoholic hydroxyl group of the threonine and serine residues; and X is selected from the group consisting of OH, $OCH_3$ and an anchoring bond used in solid phase synthesis linked to a solid resin support represented by the formula

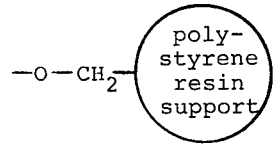

5. A compound according to claim 4 wherein X is

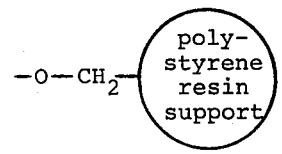

6. A compound according to claim 5 wherein R is a t-butyloxycarbonyl, $R^1$ is p-methoxybenzyl, $R^2$ is benzyloxycarbonyl, $R^3$ is benzyl and $R^4$ is benzyl.

* * * * *

UNITED STATES PATENT AND TRADEMARK OFFICE
CERTIFICATE OF CORRECTION

PATENT NO. : 3,896,105
DATED : July 22, 1975
INVENTOR(S) : Sie-Yearl Chai & John P. Yardley It is certified that error appears in the above-identified patent and that said Letters Patent are hereby corrected as shown below:

Column 5, line 35, after "nitrophenylester" insert -- [28.5 mmoles, 1% acetic acid in dimethylformamide (200 ml)].

Column 5, line 62, change "$\epsilon$" to --$\alpha$--.

Column 6, line 3, change "$\epsilon$" to --$\alpha$--.

Column 6, line 24, change "$\epsilon$" to --$\alpha$--.

Column 7, line 34, after "Phe(2.9)" insert --Lys(1.9)--.

Column 8 (claim 2, line 5) change "accidition" to --addiion--.

Signed and Sealed this twenty-third Day of December 1975

[SEAL]

Attest:

RUTH C. MASON
Attesting Officer

C. MARSHALL DANN
Commissioner of Patents and Trademarks